W. T. COOLEY.
Carriage Dash Frame.
No. 196,970. Patented Nov. 13, 1877.
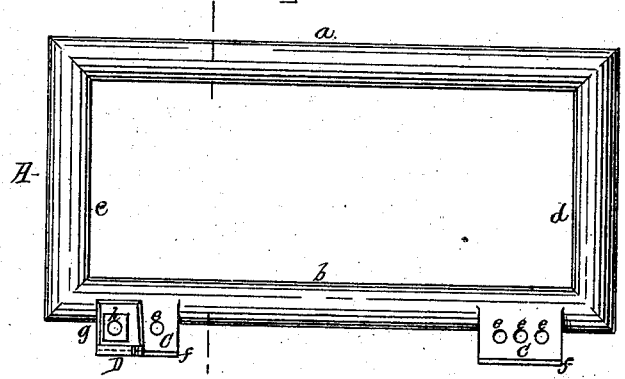
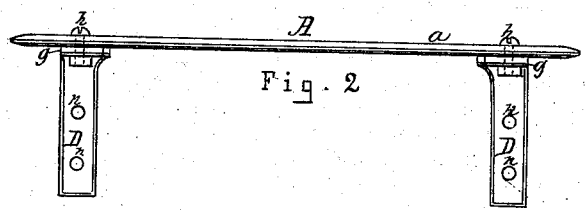
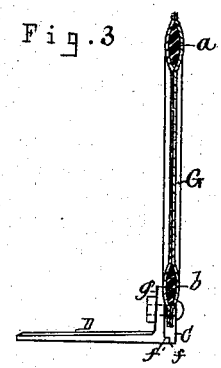
WITNESSES:
J. C. Wilche
N. H. Sherburne
INVENTOR:
William T. Cooley
By Gridley & Sherburne
Attys

UNITED STATES PATENT OFFICE.

WILLIAM T. COOLEY, OF CHICAGO, ILLINOIS.

IMPROVEMENT IN CARRIAGE-DASH FRAMES.

Specification forming part of Letters Patent No. 196,970, dated November 13, 1877; application filed April 25, 1877.

*To all whom it may concern:*

Be it known that I, WILLIAM T. COOLEY, of Chicago, in the county of Cook and State of Illinois, have invented certain new and useful Improvements in Carriage-Dash Frames; and I do hereby declare the following to be a full, clear, and exact description thereof, which will enable others skilled in the art to which my invention appertains to make and use the same, reference being had to the accompanying drawings, forming part of this specification, in which—

Figure 1 represents a rear elevation of a carriage-dash frame embodying my invention. Fig. 2 represents a general plan of the same, and Fig. 3 represents a transverse sectional elevation of the same.

Like letters of reference indicate like parts.

My invention relates to that class of dash-boards which are removably secured to the carriage-box; and the object of my invention is to improve the construction of the parts employed in connecting the dash-frame to the carriage-box.

To that end my invention consists in the construction and arrangement of the several parts, as hereinafter more fully described and claimed.

In the drawings, A represents the frame of the dash, which is made of metal bars $a$ $b$ and $c$ $d$, connected together at the ends in the usual manner. The lower bar, $b$, is provided at a point near its ends with depending brackets C C, formed thereon, and extending downward from the lower edge of said bar, as shown in Fig. 1. The brackets are provided with a series of bolt-holes, $e$, formed through them in a plane parallel with, and below the lower surface of, the bar $b$, and with a longitudinal groove, $f$, formed in the lower rear corner, as shown in Fig. 3. D D represent the foot-pieces, each of which is provided at one end with an upward-projecting lug, $g$, arranged to fit against the rear face of the brackets C C, respectively, and at the lower corner with a flange, $f'$, formed to fit into the groove $f$ in the bracket. The lug $g$ of each foot-piece is provided with a bolt-hole to receive a bolt, $h$, passing through one of the holes $e$ in the bracket, by which means the foot-pieces are firmly secured to the frame A of the dash.

The foot-pieces are provided with a series of holes, $n$, formed through them to receive suitable bolts, so as to connect them to the carriage-body, and are made of wrought or malleable iron, so as to admit of their being bent to conform to the surface of the part of the body of the carriage to which they are attached. G represents the covering of the frame, which is made of leather, commonly used, and is stitched to the frame in the usual manner, the covering upon the front of the frame extending down to the lower edge thereof, and the covering upon the rear of the dash being cut away to receive the lugs of the foot-pieces.

The object of making the foot-pieces removable from the dash-frame is to admit of stitching the covering to the frame by machinery, and thereby reduce the cost of manufacture; and by extending the brackets from and below the lower bar of the frame, the frame can be readily attached to the foot-pieces without changing the appearance of the covering of the frame; and by providing the lugs on the foot-pieces with the flange to fit into the groove in the brackets, the latter are held more firmly when the bolts are properly tightened; and by providing the brackets with a series of holes to receive the connecting-bolts, the dash may be readily adjusted to carriage-bodies of different widths.

I do not claim, broadly, a dash-frame provided with depending brackets, or with bearings having slots or bolt-holes for the attachment of separate and removable foot-pieces, as I am aware such have previously been known and used.

Having thus described my invention, what I claim as new, and desire to secure by Letters Patent, is—

The combination, with the dash-frame A, provided with the depending brackets C C, each having the series of bolt-holes $e$ and the groove $f$, of the removable foot-pieces D D, each provided with the lug $g$, having the flange $f'$ to fit the groove in the bracket, substantially as and for the purpose specified.

WILLIAM T. COOLEY.

Witnesses:
N. C. GRIDLEY,
N. H. SHERBURNE.